Aug. 21, 1962    W. KEMPF    3,050,351
END BEARING FOR JOINT STUDS
Filed Dec. 27, 1960
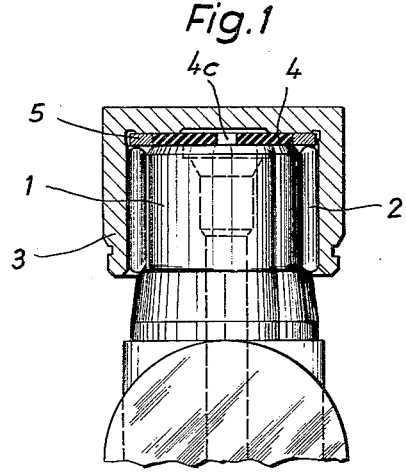
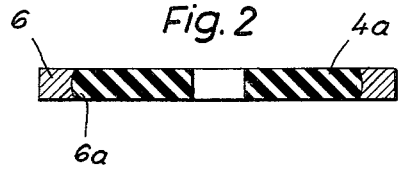
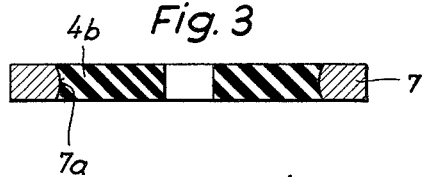
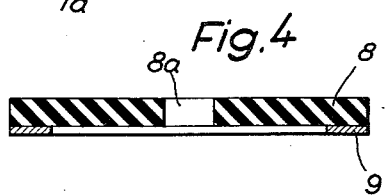

United States Patent Office 3,050,351
Patented Aug. 21, 1962

3,050,351
END BEARING FOR JOINT STUDS
Willi Kempf, Essen, Germany, assignor to Gelenkwellenbau G.m.b.H., Essen, Germany
Filed Dec. 27, 1960, Ser. No. 78,716
Claims priority, application Germany Dec. 30, 1959
9 Claims. (Cl. 308—174)

The present invention relates to end or thrust bearings for joint studs which include a disc of synthetic material arranged between the end face of the stud and the bushing surrounding the needles in which the end portion of the joint stud is journalled. This type of joint stud runs in needle bearings in which the needles are arranged directly between the stud and the bushing.

With heretofore known bearings of the type involved, the needles are guided in needle cages. Therefore, the domes at that end of the needles which is adjacent the synthetic disc cannot press or bore themselves into the softer synthetic material of the disc. However, when a so-called loose-needle bearing is employed, there exists the danger that the domes of the needles which are adjacent the synthetic disc, will press or bore into the latter because the synthetic material of which the disc is made is, as a rule not very hard.

It is, therefore, an object of the present invention to provide a thrust or end bearing for joint studs, which will overcome the above mentioned drawback inherent to relatively soft synthetic discs at the end face of the stud and loose-needle bearings employed in connection therewith.

It is another object of this invention to provide a thrust or end bearing in which a loose-needle bearing may be employed for journalling the end portion of a point stud, and in which between the end face of the stud and the bushing surrounding the needle bearing a disc of synthetic material softer than the material of the needles may be employed without running the danger that the disc will be damaged or destroyed.

These and other objects and advantages of the invention will appear more clearly from the following specification in connection with the accompanying drawings, in which:

FIG. 1 illustrates a section through an end or thrust bearing according to the present invention with a disc of synthetic material having a ring peripherally surrounding said disc in conformity with the present invention.

FIG. 2 is a section through a disc ring combination according to the present invention but somewhat modified over that of FIG. 1.

FIG. 3 represents a further modification of a disc ring combination according to the invention.

FIG. 4 shows a synthetic disc having one side of its marginal portion provided with a protective ring.

The end bearing according to the present invention is characterized primarily in that the synthetic disc interposed between the end face of the stud and the bushing surrounding the needles bearing has the peripheral portion of said disc surrounded by a ring of steel or other hard material as, for instance, polyamide for engagement with the needles loosely arranged between the stud and said bushing.

The said ring has such a width that it merely covers the range of said needles, whereas the end face of the stud is exclusively journalled on a disc of synthetic material, for instance, a disc of polyamide.

The synthetic disc may be cut off from stock material and may be pressed into the said ring. It is, of course, also possible to pour or cast the synthetic disc into said ring.

For purposes of securing the synthetic disc against axial displacement relative to the said ring surrounding the peripheral portion of the disc, which ring may also be called a marginal ring, the said ring has its inner circumferential portion designed concave or convex.

There exists, of course, also the possibility to dimension the disc in conformity with the total outer diameter of the needles or of the needle bearing and to cover that side of said disc which faces the needles, within the range of said needles by means of a protective ring which latter may be vulcanized to or inserted into the synthetic disc. In this instance, the disc has approximately the same diameter as the bore of the bushing.

More specifically, with regard to FIG. 1, this figure shows a joint stud 1 journalled in a bushing 3 by means of loose needles 2. A disc 4 of synthetic material is interposed between the end face of the stud 1 and the adjacent bottom portion of bushing 3. Disc 4 is surrounded by a protective ring 5 of steel or other hard material. The synthetic disc 4 may be pressed into a simple manner into ring 5 or may be poured into said ring 5. The synthetic disc 4 is provided with a central bore 4c for purposes of allowing a lubrication of the bearing.

FIG. 2 shows a synthetic disc 4a which is inserted into a ring 6. As will be seen from the drawing, the inner peripheral portion of ring 6 is convex so that disc 4 will be prevented from axially displacing itself on the ring 6.

According to the embodiment of FIG. 3, the synthetic disc 4b is inserted into a ring 7 having its inner circumferential portion 7a designed in a concave manner thereby preventing disc 4 from axially displacing itself. The inner circumference of the rings 5, 6 and 7 may be provided with slight protrusions or the like in order to prevent relative rotative movement between the said ring and the synthetic disc.

FIG. 4 represents a disc 8 of synthetic material which, similar to disc 4, 4a and 4b, has a central bore 8a for lubricating purposes. On that side of disc 8 which faces the stud 1, there is provided a ring 9 of steel or the like which may be vulcanized to disc 8 or may be connected thereto in any convenient or standard manner. However, it is also possible to insert the said ring into the synthetic disc.

It is, of course, to be understood that the present invention is, by no means, limited to the particular construction shown in the drawings but also comprises any modifications within the range of the appended claims.

What I claim is:

1. In combination, a joint stud having an end face, a bushing with a bottom portion facing said end face of said stud and surrounding the adjacent end portion of said stud, needles forming part of a needle bearing arranged loosely around said end portion of said stud, a disc of synthetic material interposed between said end face of said stud and said bottom, said synthetic material being softer than said needles, and ring means engaging the outer marginal portion of said disc and being interposed between said bottom and said needles for contact with the adjacent ends of said needles, the material of said ring means being at least as hard as the material of said needles.

2. An end bearing according to claim 1, in which said ring means is of steel.

3. An end bearing according to claim 1, in which said synthetic disc is of polyamide.

4. In combination, a joint stud having an end face, a bushing with a bottom portion facing said end face of said stud and surrounding the adjacent end portion of said stud, needles forming part of a needle bearing arranged loosely around said end portion of said stud, a disc of synthetic material interposed between said end face of said stud and said bottom, said synthetic material being softer than said needles, and ring means surrounding the outer peripheral portion of said disc and engaging the same with press fit, the material of said ring means being at least as hard as the material of said needles.

5. In combination, a joint stud having an end face, a bushing with a bottom portion facing said end face of said stud and surrounding the adjacent end portion of said stud, needles forming part of a needle bearing arranged loosely around said end portion of said stud, a disc of synthetic material interposed between said end face of said stud and said bottom, said synthetic material being softer than said needles, and ring means having said disc cast thereinto and being interposed between said bottom and the adjacent ends of said needles.

6. In combination, a joint stud having an end face, a bushing with a bottom portion facing said end face of said stud and surrounding the adjacent end portion of said stud, needles forming part of a needle bearing arranged loosely around said end portion of said stud, a first member in the form of a disc of synthetic material softer than said needles, said disc being interposed between said end face of said stud and said bottom, and a second member forming ring means interposed between said bottom and the adjacent end faces of said needles and engaging the outer periphery of said disc, said ring means being of a material at least as hard as that of said needles, said members engaging each other along a convex and concave surface respectively.

7. In combination, a joint stud having an end face, a bushing with a bottom portion facing said end face of said stud and surrounding the end portion of said stud, needles forming part of a needle bearing arranged loosely around said end portion of said stud, a disc of synthetic material softer than said needles and interposed between said bottom on one hand and said needles and said end face of said stud on the other hand, and ring means of a material at least as hard as the needles and interposed between a portion of said disc and said needles for engagement with said needles.

8. An end bearing according to claim 7, in which said ring means is vulcanized to said disc.

9. An end bearing according to claim 7, in which said ring means is inserted into said disc.

References Cited in the file of this patent

UNITED STATES PATENTS

| | | |
|---|---|---|
| 2,338,169 | Dunn | Jan. 4, 1944 |
| 2,795,444 | Nenzell | June 11, 1957 |